(12) United States Patent
Yamaguchi et al.

(10) Patent No.: US 8,852,745 B2
(45) Date of Patent: Oct. 7, 2014

(54) OPTICAL GLASS, PRESS-MOLDING GLASS MATERIAL, OPTICAL ELEMENT AND METHOD OF MANUFACTURING THE SAME, AND BONDED OPTICAL ELEMENT

(71) Applicant: Hoya Corporation, Tokyo (JP)

(72) Inventors: Kosuke Yamaguchi, Shinjuku-ku (JP); Naomi Matsumoto, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/650,724

(22) Filed: Oct. 12, 2012

(65) Prior Publication Data
US 2014/0106174 A1    Apr. 17, 2014

(51) Int. Cl.
  B32B 17/06 (2006.01)
  C03B 11/00 (2006.01)
  C03C 3/062 (2006.01)
  C03C 3/064 (2006.01)

(52) U.S. Cl.
  CPC .............. C03C 3/064 (2013.01); C03C 3/062 (2013.01); Y10S 501/901 (2013.01)
  USPC ........... 428/428; 428/426; 428/432; 428/689; 428/699; 428/697; 428/701; 428/702; 65/61; 65/385; 65/404; 501/78; 501/901

(58) Field of Classification Search
  USPC ......... 428/428, 432, 689, 697, 699, 702, 426, 428/688, 701; 65/61, 385, 404
  See application file for complete search history.

(56) References Cited

U.S. PATENT DOCUMENTS

| | | | | |
|---|---|---|---|---|
| 4,734,389 | A * | 3/1988 | Grabowski et al. | 501/73 |
| 5,568,325 | A * | 10/1996 | Hirano et al. | 359/785 |
| 6,038,068 | A * | 3/2000 | Takeshi et al. | 359/399 |
| 6,828,265 | B2 * | 12/2004 | Uehara | 501/73 |
| 6,995,101 | B2 * | 2/2006 | Zou et al. | 501/46 |
| 7,320,949 | B2 * | 1/2008 | Uehara | 501/73 |
| 2003/0191008 | A1 * | 10/2003 | Uehara | 501/73 |
| 2004/0220040 | A1 * | 11/2004 | Uehara | 501/73 |
| 2004/0266602 | A1 * | 12/2004 | Fujiwara et al. | 501/46 |
| 2005/0202952 | A1 * | 9/2005 | Fujiwara et al. | 501/77 |
| 2006/0081010 | A1 * | 4/2006 | Zou et al. | 65/385 |
| 2006/0105900 | A1 * | 5/2006 | Kasuga et al. | 501/78 |
| 2007/0027017 | A1 * | 2/2007 | Hachitani | 501/47 |
| 2008/0085825 | A1 * | 4/2008 | Suzuki et al. | 501/44 |
| 2009/0139268 | A1 * | 6/2009 | Fujiwara et al. | 65/404 |
| 2009/0298668 | A1 * | 12/2009 | Ikenishi | 501/44 |
| 2010/0317507 | A1 * | 12/2010 | Zou et al. | 501/77 |
| 2011/0269617 | A1 * | 11/2011 | Uehara | 501/63 |
| 2011/0287922 | A1 * | 11/2011 | Ikenishi | 501/44 |

FOREIGN PATENT DOCUMENTS

| | | | |
|---|---|---|---|
| JP | 59-050048 | A | 3/1984 |
| JP | 60-005037 | A | 1/1985 |
| JP | 61-183145 | A | 8/1986 |
| JP | 2000-159537 | A | 6/2000 |
| JP | 2002-362939 | A | 12/2002 |
| JP | 2004-161598 | A | 6/2004 |
| JP | 2004-161598 | A | 10/2004 |
| JP | 2010-006676 | A | 1/2010 |
| JP | 2012-229135 | A | 11/2012 |

OTHER PUBLICATIONS

Hyperphysics (http://hyperphysics.phy-astr.gsu.edu/hbase/geoopt/aber2.html), Feb. 2001.*
International Search Report PCT/JP2012/076509.
Written Opinion of PCT/JP2012/076509.

* cited by examiner

Primary Examiner — David Sample
Assistant Examiner — Lauren Colgan
(74) Attorney, Agent, or Firm — Sughrue Mion, PLLC

(57) ABSTRACT

An aspect of the present invention relates to an optical glass, which comprises, denoted as weight percent, 2 to 37 percent of $SiO_2$, 0 to 25 percent of $B_2O_3$, 0 to 10 percent of $GeO_2$, 18 to 55 percent of a combined content of $Li_2O$, $Na_2O$, $K_2O$, CaO, SrO, and BaO, and 27 to 55 percent of a combined content of $TiO_2$, $Nb_2O_5$, and $WO_3$, wherein the weight ratio of $SiO_2$ content relative to a combined content of $SiO_2$ and $B_2O_3$ ranges from 0.1 to 1, a weight ratio of the $Li_2O$ content to a combined content of $Li_2O$, $Na_2O$, $K_2O$, CaO, SrO, and BaO ranges from 0 to 0.4, and a weight ratio of $TiO_2$ content relative to a combined content of $TiO_2$, $Nb_2O_5$, and $WO_3$ ranges from 0.35 to 1, with a refractive index nd of 1.860 to 1.990 and an Abbé number vd of 21 to 29.

14 Claims, No Drawings

OPTICAL GLASS, PRESS-MOLDING GLASS MATERIAL, OPTICAL ELEMENT AND METHOD OF MANUFACTURING THE SAME, AND BONDED OPTICAL ELEMENT

BACKGROUND OF THE INVENTION

1. Field of the Invention

The present invention relates to an optical glass, a press-molding glass material comprised of the optical glass, an optical element comprised of the optical glass and a method of manufacturing the same, and a bonded optical element.

2. Discussion of the Background

Methods of manufacturing optical elements by heating and press molding glass materials can be roughly divided into the following two methods.

In the first method, a glass material that has been heated to a temperature at which its viscosity is about $10^{3.5}$ to $10^{4.5}$ dPa·s is introduced into a pressing mold and press molded. The molded article obtained is then ground and polished to manufacture an optical element. This method is referred to as the reheat pressing method.

In the second method, a glass material is heated to a temperature at which its viscosity is about $10^5$ to $10^9$ dPa·s and press molded to obtain an optical element. This method is referred to as the precision mold press molding method or the precision press molding method. In the second method, high pressure is applied to a high viscosity glass, and the shape of the molding surface of the pressing mold is precisely transferred to the glass, making it possible to form an optically functional surface without steps such as grinding or polishing. Thus, to prevent the molding surface of the mold from deteriorating with repeated press molding, glass with a low glass transition temperature is employed at a low press molding temperature.

As image pickup optical systems and projection optical systems with more functions and greater compactness have been developed in recent years, the need for optical elements made of high refractive index, high dispersion glass has increased. Document 1 (Japanese Unexamined Patent Publication (KOKAI) No. 2004-161598) discloses a high refractive index, high dispersion glass for use in manufacturing such optical elements. The contents of Document 1 or English language family members US2003/191008A1, U.S. Pat. No. 6,828,265, US2004/220040A1, and U.S. Pat. No. 7,320,949 are expressly incorporated herein by reference in their entirety.

Combining a lens made of a high refractive index, high dispersion glass with a lens made of a fluorophosphate glass having both low dispersion and abnormal partial dispersion makes it possible to achieve good correction of chromatic aberration. In particular, a bonded lens obtained by bonding a lens made of a high refractive index, high dispersion glass with a lens made of a fluorophosphate glass can effectively increase the functionality and compactness of an optical system.

In a bonded lens, the bonded surfaces should be precisely bonded. To that end, the bonding surface of one of the lenses is desirably precisely polished into a convex surface and the bonding surface of the other lens into a concave surface. The reheat pressing method is better suited than the precision mold press molding method to the manufacturing of such a spherical polished lens. The precision mold press molding method is suited to the manufacturing of optical elements not suited to grinding and polishing, such as lenses with aspherical surfaces, but raises the cost of manufacturing optical elements that are suited to grinding and polishing, such as spherical lenses.

Accordingly, when the present inventors attempted to reheat press mold the glass disclosed in Document 1, a high refractive index, high dispersion glass, they found that it devitrified due to low thermal stability. Thus, the glass described in Document 1 is unsuitable as a glass material for producing bonded lenses by reheat press molding.

SUMMARY OF THE INVENTION

An aspect of the present invention provides for a high refractive index, high dispersion optical glass that has good thermal stability such that it does not devitrify even in the reheat pressing method, and thus suited to the production of bonded lenses.

A further aspect of the present invention provides for a press-molding glass material comprised of the above optical glass, an optical element comprised of the above optical glass and a method of manufacturing the same, and a bonded lens in which a lens made of the above glass is bonded with a lens made of fluorophosphate glass.

An aspect of the present invention relates to:

an optical glass, which comprises, denoted as weight percent, 2 to 37 percent of $SiO_2$, 0 to 25 percent of $B_2O_3$, 0 to 10 percent of $GeO_2$, 18 to 55 percent of a combined content of $Li_2O$, $Na_2O$, $K_2O$, $CaO$, $SrO$, and $BaO$, and 27 to 55 percent of a combined content of $TiO_2$, $Nb_2O_5$, and $WO_3$;

wherein the weight ratio of $SiO_2$ content relative to a combined content of $SiO_2$ and $B_2O_3$ ($SiO_2/(SiO_2+B_2O_3)$) ranges from 0.1 to 1;

a weight ratio of the $Li_2O$ content to a combined content of $Li_2O$, $Na_2O$, $K_2O$, $CaO$, $SrO$, and $BaO$ ($Li_2O/(Li_2O+Na_2O+K_2O+CaO+SrO+BaO)$) ranges from 0 to 0.4; and a weight ratio of $TiO_2$ content relative to a combined content of $TiO_2$, $Nb_2O_5$, and $WO_3$ ($TiO_2/(TiO_2+Nb_2O_5+WO_3)$) ranges from 0.35 to 1; and which has a refractive index nd ranging from 1.860 to 1.990 and an Abbé number vd ranging from 21 to 29.

In an embodiment, the difference (Tx−Tg) between a peak crystallization temperature Tx and a glass transition temperature Tg of the above optical glass is equal to or greater than 120° C.

In an embodiment, the above optical glass has a liquidus temperature LT of equal to or lower than 1,300° C.

In an embodiment, the average coefficient of linear expansion α at 100 to 300° C. of the above optical glass is equal to or greater than $85 \times 10^{-7}$/° C.

A further aspect of the present invention relates to:

a press-molding glass material, which is comprised of the above optical glass.

A further aspect of the present invention relates to:

an optical element, which is comprised of the above optical glass.

A further aspect of the present invention relates to:

a method of manufacturing an optical element, which comprises:

preparing an optical element blank by press molding the above press-molding glass material in a heat-softened state; and grinding and polishing the optical element blank that has been prepared to provide an optical element.

A further aspect of the present invention relates to:

a bonded optical element, wherein an optical element comprised of the above optical glass is bonded to an optical element comprised of fluorophosphate glass.

An aspect of then present invention can provide a high refractive index, high dispersion optical glass having good thermal stability that does not devitrify in the reheat pressing method. Further aspects of the present invention can provide a press-molding glass material comprised of the above optical glass, an optical element comprised of the above optical glass and a method of manufacturing the same, and a bonded lens comprising a lens made of the above glass bonded with a lens made of fluorophosphate glass.

Other exemplary embodiments and advantages of the present invention may be ascertained by reviewing the present disclosure and the accompanying drawing.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Optical Glass

The optical glass of the present invention is an optical glass, which comprises, denoted as weight percent, 2 to 37 percent of $SiO_2$, 0 to 25 percent of $B_2O_3$, 0 to 10 percent of $GeO_2$, 18 to 55 percent of a combined content of $Li_2O$, $Na_2O$, $K_2O$, CaO, SrO, and BaO, and 27 to 55 percent of a combined content of $TiO_2$, $Nb_2O_5$, and $WO_3$;

wherein the weight ratio of $SiO_2$ content relative to a combined content of $SiO_2$ and $B_2O_3$ ($SiO_2/(SiO_2+B_2O_3)$) ranges from 0.1 to 1;

a weight ratio of the $Li_2O$ content to a combined content of $Li_2O$, $Na_2O$, $K_2O$, CaO, SrO, and BaO ($Li_2O/(Li_2O+Na_2O+K_2O+CaO+SrO+BaO)$) ranges from 0 to 0.4; and a weight ratio of $TiO_2$ content relative to a combined content of $TiO_2$, $Nb_2O_5$, and $WO_3$ ($TiO_2/(TiO_2+Nb_2O_5+WO_3)$) ranges from 0.35 to 1; and which has a refractive index nd ranging from 1.860 to 1.990 and an Abbé number νd ranging from 21 to 29.

The optical glass of the present invention will be described in detail below. Unless specifically stated otherwise, the quantities and combined quantities of the various components are denoted as weight percent, and the ratios of glass component contents and combined contents are weight ratios.

$SiO_2$ is an essential component that functions to form the glass network, raise the thermal stability of the glass, and lower the liquidus temperature. At an $SiO_2$ content of less than 2 percent, the thermal stability of the glass drops and the liquidus temperature rises. At an $SiO_2$ content exceeding 37 percent, the refractive index drops and it becomes difficult to achieve desired optical characteristics. Accordingly, the $SiO_2$ content is 2 to 37 percent. The lower limit of the $SiO_2$ content is desirably 4 percent, preferably 6 percent, more preferably 8 percent, and still more preferably, 10 percent.

When the optical glass of the present invention is employed as a lens that is bonded to a lens made of fluorophosphate glass, it is desirable to raise the coefficient of expansion of the glass. Fluorophosphate glass has a high expansion characteristic even for an optical glass. Thus, when the coefficient of expansion of the glass to which it is bonded is low, the difference in expansion of the two bonded glasses tends to cause defect at the bonded surfaces during adhesion and when stored at elevated temperature and high humidity. For example, lens adhesion is normally conducted by applying an ultraviolet radiation-curable adhesive to the surfaces being bonded and irradiating it with ultraviolet radiation through the lens. Heat is generated in the process. When the difference in expansion between the two types of glass is considerable, defect occurs in the manner set forth above.

For these reasons, a high expansion coefficient is desirable. However, $SiO_2$ functions to lower the expansion coefficient. Accordingly, to maintain a high refractive index and raise the expansion coefficient, the upper limit of the $SiO_2$ content is desirably 32 percent, preferably 27 percent, and more preferably, 25 percent.

An optical glass with a composition based on $SiO_2$ will be stronger than a phosphate-based optical glass. Since the process of manufacturing a bonded lens is complex, the lenses employed in the bonded lens tend to be scratched during handling. However, the optical lens of the present invention has a composition system that is based on $SiO_2$. Thus, the optical glass of the present invention can also provide a lens that is less prone to scratching than one made of a phosphate-based optical glass of identical high refractive index and high dispersion.

$B_2O_3$ is an optional glass network-forming component that functions to maintain the thermal stability of the glass and lower the liquidus temperature. A $B_2O_3$ content exceeding 25 percent lowers the refractive index and makes it difficult to achieve desired characteristics. Accordingly, the $B_2O_3$ content is 0 to 25 percent. The upper limit of the $B_2O_3$ content is desirably 20 percent, preferably 15 percent, more preferably 13 percent, and still more preferably 11 percent. To further lower the liquidus temperature, the lower limit of the $B_2O_3$ content is desirably 0.1 percent, preferably 0.3 percent.

The $SiO_2$ and $B_2O_3$ contents are as set forth above. In the optical glass of the present invention, to maintain the thermal stability of the glass and suppress increase of the liquidus temperature, the weight ratio of the $SiO_2$ content to the combined content of $SiO_2$ and $B_2O_3$ ($SiO_2/(SiO_2+B_2O_3)$) is equal to or higher than 0.1. When $SiO_2/(SiO_2+B_2O_3)$ is increased, the viscosity when molding the glass melt increases and it becomes easier to mold high-quality glass. Thus, the lower limit of $SiO_2/(SiO_2+B_2O_3)$ is desirably 0.2, preferably 0.3, more preferably 0.5, still more preferably 0.6, and yet still more preferably, 0.7. The upper limit of this weight ratio becomes 1 when no $B_2O_3$ is contained. By varying $SiO_2/(SiO_2+B_2O_3)$ within the above stated range, it is possible to adjust the expansion coefficient and refractive index. When $SiO_2/(SiO_2+B_2O_3)$ is lowered, the expansion coefficient increases and the refractive index nd rises.

$GeO_2$ is an optional component that forms the glass network and effectively functions to maintain a higher refractive index than $SiO_2$ or $B_2O_3$. However, it is an especially expensive component among the essential and optional components constituting the optical glass of the present invention. Thus, the content thereof is 0 to 10 percent. To lower the cost of manufacturing the glass and obtain a high refractive index glass that is widely disseminated, the $GeO_2$ content desirably falls within a range of 0 to 5 percent, preferably within a range of 0 to 3 percent, more preferably within a range of 0 to 1 percent, and still more preferably, no $GeO_2$ is incorporated at all.

$Li_2O$, $Na_2O$, $K_2O$, $CaO$, $SrO$, and $BaO$ are components that modify the glass network, functioning to improve the meltability of the glass and raise the coefficient of expansion thereof. When the combined content of $Li_2O$, $Na_2O$, $K_2O$, $CaO$, $SrO$, and $BaO$ is less than 18 percent, it becomes difficult to achieve the above-stated effects. When the combined content exceeds 55 percent, the thermal stability of the glass decreases and the liquidus temperature rises. Accordingly, the combined content of $Li_2O$, $Na_2O$, $K_2O$, $CaO$, $SrO$, and $BaO$ is 18 to 55 percent. The lower limit of the combined content is desirably 20 percent, and preferably, 22 percent. The upper limit thereof is desirably 50 percent, preferably 47 percent, and more preferably, 45 percent.

However, when the weight ratio of the $Li_2O$ content to the combined content of $Li_2O$, $Na_2O$, $K_2O$, $CaO$, $SrO$, and $BaO$ ($Li_2O/(Li_2O+Na_2O+K_2O+CaO+SrO+BaO)$) exceeds 0.4, the thermal stability of the glass deteriorates, particularly the resistance to devitrification of the glass when reheated, rendering the glass unsuited to the reheat press molding method. Thus, $Li_2O/(Li_2O+Na_2O+K_2O+CaO+SrO+BaO)$ is 0 to 0.4. The upper limit of $Li_2O/(Li_2O+Na_2O+K_2O+CaO+SrO+BaO)$ is desirably 0.3, preferably 0.2. The lower limit of this weight ratio becomes zero when no $Li_2O$ is incorporated, but can also be equal to or higher than 0.01.

The combined content of $Li_2O$, $Na_2O$, $K_2O$, $CaO$, $SrO$, and $BaO$, and the weight ratio of the $Li_2O$ content to this combined content, are as set forth above. The contents of these components will be described next.

$Li_2O$ is a component among the above modifying components that functions relatively well to maintain a high refractive index. However, as stated above, it decreases the thermal stability of the glass, and in particular, decreases its resistance to devitrification with reheating, when incorporated in excessive quantity. Accordingly, in order to keep the combined quantity of modifying components within the above stated ratio, the $Li_2O$ content is desirably kept to within a range of 0 to 8 percent, preferably to within a range of 0 to 6 percent, and more preferably, to within a range of 0 to 4 percent.

When the contents of both $Na_2O$ and $K_2O$ are increased, the thermal stability of the glass may deteriorate and the liquidus temperature may rise. Thus, the content of $Na_2O$ is desirably kept to within a range of 0 to 20 percent, preferably to within a range of 0 to 14 percent, and more preferably, to within a range of 0 to 12 percent. The $K_2O$ content is desirably kept to within a range of 0 to 11 percent, preferably to within a range of 0 to 9 percent, and more preferably, to within a range of 0 to 7 percent.

Among the modifying components, $CaO$ and $BaO$ function relatively well to maintain a high refractive index. However, their incorporation in excessive quantity may decrease thermal stability and tends to raise the liquidus temperature. Thus, the $CaO$ content desirably falls within a range of 0 to 30 percent. The upper limit of the $CaO$ content is desirably 27 percent, preferably 25 percent. Additionally, the lower limit of the $CaO$ content is desirably 1 percent, preferably 2 percent. The $BaO$ content is desirably 2 to 47 percent. The upper limit of the $BaO$ content is desirably 45 percent, preferably 44 percent, and the lower limit is desirably 3 percent, preferably 5 percent.

As set forth above, to maintain a high refractive index, the combined content of $CaO$ and $BaO$ is desirably equal to or higher than 9 percent, preferably equal to or higher than 11 percent, and more preferably, equal to or higher than 13 percent. To maintain good thermal stability and a good liquidus temperature, the combined content of $CaO$ and $BaO$ is desirably equal to or lower than 48 percent, preferably equal to or lower than 46 percent, and more preferably, equal to or lower than 44 percent.

To maintain a high refractive index, the weight ratio of the combined content of $CaO$ and $BaO$ to the combined content of $Li_2O$, $Na_2O$, $K_2O$, $CaO$, $SrO$, and $BaO$ ($(CaO+BaO)/(Li_2O+Na_2O+K_2O+CaO+SrO+BaO)$) desirably falls within a range of 0.30 to 1, preferably falls within a range of 0.40 to 1, and more preferably, falls within a range of 0.45 to 1. This weight ratio can also be 1.

The $SrO$ content is determined based on the value of the weight ratio $(CaO+BaO)/(Li_2O+Na_2O+K_2O+CaO+SrO+BaO)$, and can be 0 percent or greater than 0 percent.

To achieve better thermal stability while maintaining a high refractive index and high dispersion, the combined quantity of the above alkaline earth metal oxides is desirably greater than the combined quantity of alkali metal oxides.

$TiO_2$, $Nb_2O_5$, and $WO_3$ are all components that function well to raise the refractive index of the glass. When the combined content of $TiO_2$, $Nb_2O_5$, and $WO_3$ is less than 27 percent, it becomes difficult to achieve the desired refractive index nd and Abbé number νd, and at greater than 55 percent, the thermal stability of the glass decreases and the liquidus temperature rises. Accordingly, the combined content of $TiO_2$, $Nb_2O_5$, and $WO_3$ is 27 to 55 percent. The lower limit of the combined content of $TiO_2$, $Nb_2O_5$, and $WO_3$ is desirably 29 percent, preferably 30 percent, and the upper limit thereof is desirably 52 percent, preferably 49 percent.

However, when the weight ratio of the $TiO_2$ content to the combined content of $TiO_2$, $Nb_2O_5$, and $WO_3$ ($TiO_2/(TiO_2+Nb_2O_5+WO_3)$) is less than 0.35, the thermal stability of the glass decreases and the liquidus temperature thereof rises. Thus, $TiO_2/(TiO_2+Nb_2O_5+WO_3)$ is kept to within a range of 0.35 to 1. From the perspectives of maintaining thermal stability and preventing a rise in the liquidus temperature, the lower limit of $TiO_2/(TiO_2+Nb_2O_5+WO_3)$ is desirably 0.4, preferably 0.45, and the upper limit is desirably 0.9, preferably 0.85. The upper limit of the above weight ratio becomes 1 when $Nb_2O_5$ and $WO_3$ are not incorporated.

The combined content of $TiO_2$, $Nb_2O_5$, and $WO_3$ and the weight ratio $TiO_2/(TiO_2+Nb_2O_5+WO_3)$ are as set forth above. To maintain thermal stability and prevent a rise in the liquidus temperature while maintaining a high refractive index and high dispersion characteristics, the lower limit of the $TiO_2$ content is desirably 9 percent, preferably 11 percent, and more preferably, 13 percent, and the upper limit is desirably 35 percent, preferably 33 percent, and more preferably, 31 percent.

The lower limit of the $Nb_2O_5$ content is desirably 2 percent, preferably 4 percent, and more preferably 6 percent, and the upper limit is desirably 36 percent, preferably 32 percent, and more preferably, 28 percent.

The upper limit of the $WO_3$ content is desirably 5 percent, preferably 4 percent, and more preferably, 3 percent. It is possible to incorporate no $WO_3$, as well as for the $WO_3$ content to be greater than 0 percent.

$La_2O_3$ is an optional component that functions well to raise the refractive index of the glass. However, when incorporated in excessive quantity, it may diminish thermal stability and raise the liquidus temperature. Thus, the $La_2O_3$ content desirably falls within a range of 0 to 15 percent, preferably within a range of 0 to 13 percent, and more preferably, within a range of 0 to 11 percent.

$ZrO_2$ is an optional component that functions well to raise the refractive index of the glass. However, when incorporated in excessive quantity, it may diminish thermal stability and raise the liquidus temperature. Thus, the $ZrO_2$ content desirably falls within a range of 0 to 12 percent. The upper limit of the $ZrO_2$ content is desirably 11 percent, preferably 10 percent. To enhance the effect of $ZrO_2$, the $ZrO_2$ content is desirably equal to or greater than 1 percent.

The above components, listed in order of decreasing strength in terms of raising the expansion coefficient, are: $K_2O$, $Na_2O$, $BaO$, $SrO$, $CaO$, $Li_2O$, $TiO_2$, $B_2O_3$, $Nb_2O_5$, and $SiO_2$. This tendency can be considered in adjusting the expansion coefficient.

Clarifying agents such as $Sb_2O_3$ and $SnO_2$ can be added as additives. Of these clarifying agents, $Sb_2O_3$ is desirable. When employing $Sb_2O_3$, the quantity of $Sb_2O_3$ added as a weight ratio relative to the combined total desirably falls within a range of 0 to 1 percent. The phrase "quantity added as a weight ratio relative to the combined total" means the quantity added expressed as a ratio based on the weight of the glass components. In addition to having a clarifying effect, within the glass melt, $Sb_2O_3$ functions to place the above high refractive index components in an oxidized state and stabilize the oxidized state. However, when the quantity added relative to the combined total exceeds 1 percent, the light absorption of Sb itself tends to cause the glass to discolor. From the perspective of improving the transmittance characteristics of the glass, the upper limit of the quantity of $Sb_2O_3$ added relative to the combined total is desirably 0.8 percent, preferably 0.6 percent, and the lower limit is 0.4 percent.

Small quantities of $NO_3$, $CO_3$, $SO_4$, F, Cl, Br, I and the like can also be added.

Out of concern for the environment, it is desirable not to add or incorporate any of the following into the optical glass of the present invention: Pb, As, Cd, Te, Tl, and Se. Further, cations of V, Cr, Mn, Fe, Co, Ni, Cu, Pr, Nd, Eu, Tb, Ho, and Er all discolor the glass or generate fluorescence when irradiated with ultraviolet radiation, and are thus desirably not added or incorporated. However, the phrase "not to add or incorporate" does not exclude their presence as impurities derived from the glass starting materials or from the step of melting the glass.

[Refractive Index and Abbé Number]

The refractive index nd of the optical glass of the present invention is 1.860 to 1.990 and its Abbé number vd is 21 to 29. A refractive index nd of equal to or greater than 1.860 and an Abbé number vd of equal to or lower than 29 make it possible to provide an optical element material that effectively increases the functionality and compactness of an optical system. Further, combination with an optical element of low dispersion glass, particularly in a bonded lens, makes it possible to provide an optical material affording a good chromatic aberration correcting function.

To maintain the thermal stability of the glass, the refractive index nd is equal to or lower than 1.990 and the Abbé number vd is equal to or higher than 21.

From the above perspective, the lower limit of the refractive index nd in the present invention is desirably 1.870, preferably 1.885, and the upper limit is desirably 1.985, preferably 1.980.

The lower limit of the Abbé number vd in the present invention is desirably 22, and preferably, 23, and the upper limit thereof is desirably 28, and preferably, 27.

[Thermal Stability]

The thermal stability of the glass includes resistance to devitrification in the course of molding the glass melt and resistance to devitrification when the glass is reheated after having been solidified once.

In resistance to devitrification in the course of molding the glass melt, the liquidus temperature is employed as a yardstick: the lower the liquidus temperature, the better the resistance to devitrification. In a glass with a high liquidus temperature, to prevent devitrification, the temperature of the glass melt, that is, of the molten glass must be kept high, causing volatile components to volatize and exacerbating corrosion of the crucible. Particularly in the case of a crucible made of a noble metal, noble metal ions leach out into the glass melt, discoloring the glass. The viscosity during molding decreases, making it difficult to mold highly homogeneous glass. Thus, the liquidus temperature LT of the optical glass of the present invention is desirably equal to or lower than 1,300° C., preferably equal to or lower than 1,250° C., more preferably equal to or lower than 1,200° C., and still more preferably, equal to or lower than 1,180° C.

With regard to resistance to devitrification when the glass is reheated after having been solidified once, the greater the difference between the peak crystallization temperature Tx and the glass transition temperature Tg (Tx−Tg), the better the resistance to devitrification of the glass can be considered to be (see YAMANE, Masayuki, "For Persons Fabricating Glass for the First Time (Foundation Course on Ceramics)," published by Uchida Rokakuho, p. 150).

The glass transition temperature Tg and peak crystallization temperature Tx are determined as follows. In differential scanning calorimetric analysis, as the temperature of a glass sample rises, the heat absorption behavior accompanying the change in specific heat, that is, an endothermic peak, appears. As the temperature continues to rise, an exothermic peak appears. In differential scanning calorimetric analysis, a differential scanning calorimetric curve (DSC curve) is obtained in which the temperature is plotted on the X axis and the quantity corresponding to the exothermic and endothermic property of the sample is plotted on the Y axis. The point of intersection with the baseline of the tangent at the point of the greatest slope where the endothermic peak appears on the baseline of the curve is adopted as the glass transition temperature Tg, and the point of intersection with the baseline of the tangent at the point of the greatest slope where the exothermic peak appears is adopted as the peak crystallization temperature Tx.

The glass transition temperature Tg and peak crystallization temperature Tx can be measured by thoroughly pulverizing the glass in a mortar to obtain a sample and employing, for example, a DSC3300SA high-temperature differential scanning calorimeter made by Bruker.

In reheat press molding in which a glass material is softened by heating and molded into a desired shape, it is necessary to heat the glass material to a temperature higher than the glass transition temperature. When the temperature of the glass during molding reaches the crystallization temperature range, devitrification occurs. Thus, glasses of low (Tx−Tg) are disadvantageous in terms of molding while preventing devitrification. Conversely, glasses of high (Tx−Tg) are advantageous in terms of conducting molding by softening by reheating without devitrification.

For these reasons, the lower limit of the difference (Tx−Tg) in the peak crystallization temperature Tx and the glass transition temperature Tg is desirably 120° C., preferably 130° C., and more preferably, 140° C.

When the glass transition temperature Tg decreases, (Tx−Tg) does not automatically increase. In the optical glass disclosed in Document 1, adjustment of the composition to lower the glass transition temperature also lowers the peak crystallization temperature, precluding an increase in (Tx−Tg). As a result, the glass becomes unsuitable for use in reheat press molding. In precision mold press molding, press molding is conducted at a relatively low temperature several tens of degrees Celsius above the glass transition temperature, so molding is possible even with a small (Tx−Tg).

To obtain an optical glass that is suited to the reheat press molding method, it is not desirable to excessively lower the glass transition temperature. For such reasons, the lower limit of the glass transition temperature Tg is desirably 590° C., preferably 595° C., and more preferably, 600° C.

[Expansion Coefficient]

The average coefficient of linear expansion α at 100 to 300° C. of a fluorophosphate optical glass employed to fabricate a bonded lens falls roughly within a range exceeding 130×$10^{-7}$/° C. As set forth above, to provide a material for optical elements that is suited to bonding with an optical element made of fluorophosphate glass, the average coefficient of linear expansion α at 100 to 300° C. of the optical glass of the present invention is desirably equal to or higher than 85×$10^{-7}$/° C., preferably equal to or higher than 90×$10^{-7}$/° C.

The average coefficient of linear expansion can be measured by preparing a cylindrical glass sample 5 mm in diameter and 20 mm in length and using a TMA4000s thermomechanical analyzer made by Bruker AXS.

[Partial Dispersion]

To conduct high-order chromatic aberration correction in image pickup optical systems, light projection systems, and the like, it is effective to combine a lens comprised of the optical glass of the present invention with a lens comprised of a low dispersion glass. However, many low dispersion glasses have high partial dispersion ratios. Thus, when conducting high-order chromatic aberration correction, a low partial dispersion ratio is required of the optical glass of the present invention that is combined with the lens made of a low dispersion glass.

The partial dispersion ratio Pg, F is denoted using the various refractive indexes ng, nF, and nc at the g-line, F-line, and c-line: (ng−nF)/(nF−nC).

In the optical glass of the present invention, to provide a glass that is suited to high-order chromatic aberration correction, partial dispersion ratio Pg, F is desirably equal to or lower than 0.600. Pg, F is preferably equal to or lower than 0.598, more preferably equal to or lower than 0.596, still more preferably equal to or lower than 0.594, yet more preferably equal to or lower than 0.592, and yet still more preferably, equal to or lower than 0.590.

However, when partial dispersion ratio Pg, F is reduced excessively, there is a tendency for other characteristics to depart from the preferred ranges. Thus, partial dispersion ratio Pg, F is desirably equal to or higher than 0.570. The lower limit of partial dispersion ratio Pg, F is preferably 0.575, more preferably 0.580, still more preferably 0.582, yet more preferably 0.584, and yet still more preferably, 0.586.

[Coloration (λ80, λ70, λ5)]

With the above glass composition, coloration can be reduced or inhibited in the optical glass of the present invention. Thus, it can exhibit high optical transparency over a broad range in the visible light region. The wavelength λ80 at which light transmittance over the wavelength range of 280 to 700 nm becomes 80 percent, the wavelength λ70 at which this light transmittance becomes 70 percent, and the wavelength λ5 at which this light transmittance becomes 5 percent can be employed as indexes of the coloration of an optical glass. In this context, the term "light transmittance" is the spectral transmittance achieved by directing light perpendicularly onto the polished surface of a glass sample having polished, mutually parallel surfaces and having a thickness of 10.0±0.1 mm. That is, it is Iout/Iin, where the intensity of the light entering the sample is denoted by Iin and the intensity of the light passing through the sample is denoted by Iout. The spectral transmittance includes the loss of light reflecting off the sample surface. The above-mentioned "polishing" means that the surface roughness has been adequately reduced relative to wavelengths in the wavelength range at which measurement is conducted.

For λ70, the optical glass of the present invention can exhibit a λ70 at equal to or less than 530 nm. The λ70 of the optical glass of the present invention is desirably equal to or lower than 500 nm, preferably equal to or lower than 490 nm, and more preferably equal to or lower than 480 nm.

For λ80, the optical glass of the present invention can exhibit a λ80 at equal to or less than 660 nm. The λ80 of the optical glass of the present invention is desirably equal to or lower than 600 nm, preferably equal to or lower than 590 nm, and more preferably equal to or lower than 580 nm.

λ5 desirably falls within a range of equal to or lower than 430 nm, preferably equal to or lower than 420 nm, more preferably equal to or lower than 410 nm, still more preferably equal to or lower than 400 nm, and yet more preferably, equal to or lower than 390 nm.

Thus, the optical glass of the present invention can exhibit good optical transparency while being a high refractive index glass, and is suitable as a material for the optical elements constituting image pickup optical systems and projection optical systems.

Specific Gravity

The optical glass of the present invention is a high refractive index glass. High refractive index glasses normally tend to have high specific gravities. However, increased specific gravity is undesirable in that it invites an increase in the weight of optical elements. By contrast, the optical glass of the present invention has the above glass composition, making it possible to keep the specific gravity to equal to or less than 4.5 while remaining a high refractive index glass. In the optical glass of the present invention, the upper limit of the specific gravity is desirably 4.4, preferably 4.3, more preferably 4.2, and still more preferably 4.1. However, when the specific gravity is reduced excessively, the stability of the glass may decrease, and the liquidus temperature tends to rise. Thus, the specific gravity is desirably equal to or higher than 3.5, preferably equal to or higher than 3.6, more preferably equal to or higher than 3.7, still more preferably equal to or higher than 3.8, and yet more preferably, equal to or higher than 3.9.

[Method of Manufacturing the Optical Glass]

The optical glass of the present invention can be manufactured by a glass melting method of heating, melting, clarifying, and homogenizing the glass starting materials, and molding the molten glass obtained. A known glass melting method can be employed. Glass starting materials in the form of oxides, carbonates, nitrates, sulfates, hydroxides, and the like can be weighed out in a manner that will yield a glass of the desired composition and thoroughly mixed to obtain a powder starting material. This powder starting material can then be heated and melted, or the powder starting material can be coarsely melted to form cullets and multiple cullets can be blended to obtain a starting material that is then heated and melted.

As set forth further below, the molded glass article that is obtained by molding the molten glass can be annealed to remove distortion and then used to produce a press-molding glass material.

Press-Molding Glass Material

The press-molding glass material of the present invention is comprised of the above optical glass of the present invention. Since it is comprised of an optical glass having good resistance to devitrification when softened by reheating, it can yield high-quality press-molded products without the glass undergoing devitrification during reheat press molding. Employing a glass with good resistance to devitrification during molten glass molding also makes it possible to obtain high-quality press-molded products. The shape of the press-molding glass material can be suitably determined based on the shape of the press molded article that is being manufactured, and the weight of the glass material can be made to conform to the weight of the press molded article.

An example of a method of manufacturing a press-molding glass material will be given below.

The molded glass article set forth above is annealed to remove distortion, divided into multiple pieces of glass (cut pieces) by mechanical processing, and then subjected to barrel polishing to fabricate a press-molding glass material. Instead of barrel polishing, the glass pieces can be ground and polished to fabricate press-molding glass materials.

Optical Element and Method of Manufacturing the Same

The optical element of the present invention is comprised of the above optical glass of the present invention.

The optical element of the present invention can utilize the high refractive index and high dispersion characteristics of the optical glass of the present invention to provide an optical element that is effective for increasing the functionality and compactness of various optical systems such as image pickup optical systems and projection optical systems.

Further, a glass having high expansion characteristics in the form of a $SiO_2$-based high refractive index high dispersion glass is suitable for bonding to an optical element comprised of a glass with a high expansion coefficient in the form of a fluorophosphate glass or the like.

Examples of the optical element of the present invention are lenses and prisms.

When combining a lens made of a high refractive index, high dispersion glass with a lens made of a low dispersion glass to correct chromatic aberration, it is advantageous in terms of optical design to make the power of the lens negative on the high refractive index, high dispersion side and make the power of the lens positive on the low dispersion side. Thus, the optical element of the present invention is desirably a lens of negative power, such as a biconcave lens, concave meniscus lens, or planoconcave lens. For use as a bonded lens, at least one of the optically functional surfaces of the lens is desirably spherical, and both are preferably spherical.

The method of manufacturing an optical element of the present invention comprises preparing an optical element blank by press molding the above press-molding glass material of the present invention while in a heat-softened state; and grinding and polishing the optical element blank that has been prepared to obtain an optical element.

Prior to the grinding and polishing step, it is desirable to anneal the optical element blank to prevent damage. In the annealing, distortion can be removed from the glass and the temperature reduction speed during annealing can be adjusted to finely adjust the refractive index.

The optical element of the present invention can be manufacturing by annealing, grinding, and polishing the molded glass article obtained by molding the molten glass.

Bonded Optical Element

The bonded optical element of the present invention is obtained by bonding an optical element comprised of the above optical glass of the present invention with an optical element comprised of fluorophosphate glass.

Bonding the optical element made of the high refractive index high dispersion glass of the present invention to an optical element made of fluorophosphate glass having abnormal partial dispersion and low dispersion makes it possible to obtain a bonded optical element capable of good chromatic aberration correction. Application of the bonded optical element to optical systems such as image pickup optical systems and projection optical systems can achieve an optical system of high functionality and compactness.

By way of example, a known fluorophosphate optical glass such as FCD1, FCD100, or FCD505 made by Hoya can be employed as the fluorophosphate glass that is bonded to the optical element of the present invention.

Examples of bonded optical elements are those in which lenses are bonded together (bonded lenses) and those in which a lens and a prism are bonded together.

Making the power of the lens negative on the high refractive index high dispersion side and the power of the lens positive in the lens made of fluorophosphate glass can provide a bonded lens that effectively imparts high functionality and compactness to an optical system while affording a good chromatic aberration correction function.

The bonded optical element can be fabricated by conducting precise processing (for example, by polishing the spherical surfaces) so that the shapes of the bonded surfaces of the two bonded optical elements are the inverse of each other, adhering an ultraviolet radiation-curable adhesive used to adhere the bonded lenses, bonding the two, and irradiating them with ultraviolet radiation to cure the adhesive.

EXAMPLES

The present invention will be described in detail below based on Examples. However, the present invention is not limited to the embodiments shown in Examples.

Example 1

To obtain each of glass Nos. 1 to 30 having the compositions indicated in Table 1, powder starting materials in the form of carbonates, nitrates, hydroxides, and oxides were weighed out and thoroughly mixed to blend starting materials. The blended starting materials were charged to platinum crucibles, heated to 1,300° C., melted, clarified, and stirred to obtain homogenous glass melts. The glass melts were caused to flow into preheated casting molds and rapidly cooled. After being maintained for 2 hours at a temperature in the vicinity of the glass transition temperature, the melts were gradually cooled to obtain the various optical glasses of glass Nos. 1 to 30. No precipitation of crystals was observed in any of the glasses.

The characteristics of each of the glasses indicated in Table 1 were measured by the following methods. The measurement results are given in Table 1.

(1) Refractive Indexes nd, nc, nF, ng; Abbé Number νd

These were measured for optical glasses that had been cooled at a rate of temperature decrease of 30° C. per hour by the refractive index measuring methods specified by the Japan Optical Glass Manufacturers' Association.

(2) Glass Transition Temperature Tg and Peak Crystallization Temperature Tx

The glass was thoroughly pulverized in a mortar to prepare a sample. The sample was measured while raising the temperature to 1,250° C. at a rate of temperature increase of 10° C./minute using a DCS3300SA high-temperature differential scanning calorimeter made by Bruker.

(3) Liquidus Temperature

The glass was placed in a furnace that had been heated to a prescribed temperature and maintained there for two hours. Following cooling, the interior of the glass was examined for crystals by an optical microscope at 100-fold magnification. The lowest temperature at which the crystals disappeared was adopted as the liquidus temperature.

(4) Average Coefficient of Linear Expansion α at 100 to 300° C.

This was measured by the method prescribed in JOGIS 08-1975 "Method of Measuring the Thermal Expansion of Optical Glass" of the Japan Optical Glass Manufacturers' Association.

(5) Specific Gravity

This was measured by Archimedes' method.

(6) Partial Dispersion Ratio Pg, F

This was calculated using the following equation from the values of refractive indexes ng, nF, and nc:

$$Pg,F=(ng-nF)/(nF-nc)$$

(7) Degree of Coloration λ80, λ70, λ5

These were obtained by measurement of spectral transmittance with a spectrophotometer.

TABLE 1

| No. | | $SiO_2$ | $B_2O_3$ | $GeO_2$ | $Li_2O$ | $Na_2O$ | $K_2O$ | CaO | BaO | SrO | $TiO_2$ | $Nb_2O_5$ | $WO_3$ | $La_2O_3$ | $ZrO_2$ | Total |
|---|---|---|---|---|---|---|---|---|---|---|---|---|---|---|---|---|
| 1 | Cation % | 24.68 | 4.69 | 0 | 6.82 | 0 | 0 | 32.12 | 0 | 0 | 15.2 | 10.28 | 0 | 1.25 | 4.96 | 100 |
|   | Mole % | 27.89 | 2.65 | 0 | 3.85 | 0 | 0 | 36.3 | 0 | 0 | 17.18 | 5.81 | 0 | 0.71 | 5.61 | 100 |
|   | Mass % | 21.35 | 2.35 | 0 | 1.47 | 0 | 0 | 25.95 | 0 | 0 | 17.48 | 19.67 | 0 | 2.93 | 8.8 | 100 |
| 2 | Cation % | 27.18 | 4.69 | 0 | 6.82 | 0 | 0 | 22.12 | 5 | 0 | 17.7 | 10.28 | 0 | 1.25 | 4.96 | 100 |
|   | Mole % | 30.72 | 2.65 | 0 | 3.85 | 0 | 0 | 25 | 5.65 | 0 | 20 | 5.81 | 0 | 0.71 | 5.61 | 100 |
|   | Mass % | 21.77 | 2.18 | 0 | 1.36 | 0 | 0 | 16.54 | 10.22 | 0 | 18.85 | 18.22 | 0 | 2.71 | 8.15 | 100 |
| 3 | Cation % | 27.18 | 4.69 | 0 | 6.82 | 0 | 0 | 7.12 | 20 | 0 | 17.7 | 10.28 | 0 | 1.25 | 4.96 | 100 |
|   | Mole % | 30.72 | 2.65 | 0 | 3.85 | 0 | 0 | 8.05 | 22.6 | 0 | 20 | 5.81 | 0 | 0.71 | 5.61 | 100 |
|   | Mass % | 18.23 | 1.82 | 0 | 1.14 | 0 | 0 | 4.46 | 34.23 | 0 | 15.78 | 15.25 | 0 | 2.27 | 6.82 | 100 |
| 4 | Cation % | 27.18 | 4.69 | 0 | 6.82 | 0 | 0 | 0 | 27.12 | 0 | 17.7 | 10.28 | 0 | 1.25 | 4.96 | 100 |
|   | Mole % | 30.72 | 2.65 | 0 | 3.85 | 0 | 0 | 0 | 30.65 | 0 | 20 | 5.81 | 0 | 0.71 | 5.61 | 100 |
|   | Mass % | 16.92 | 1.69 | 0 | 1.06 | 0 | 0 | 0 | 43.08 | 0 | 14.65 | 14.16 | 0 | 2.11 | 6.33 | 100 |
| 5 | Cation % | 27.18 | 4.69 | 0 | 6.82 | 0 | 0 | 14.62 | 12.5 | 0 | 17.7 | 10.28 | 0 | 1.25 | 4.96 | 100 |
|   | Mole % | 30.72 | 2.65 | 0 | 3.85 | 0 | 0 | 16.52 | 14.13 | 0 | 20 | 5.81 | 0 | 0.71 | 5.61 | 100 |
|   | Mass % | 19.84 | 1.98 | 0 | 1.24 | 0 | 0 | 9.96 | 23.29 | 0 | 17.18 | 16.6 | 0 | 2.47 | 7.43 | 100 |
| 6 | Cation % | 27.18 | 4.69 | 0 | 6.82 | 0 | 0 | 9.62 | 17.5 | 0 | 17.7 | 10.28 | 0 | 1.25 | 4.96 | 100 |
|   | Mole % | 30.72 | 2.65 | 0 | 3.85 | 0 | 0 | 10.87 | 19.78 | 0 | 20 | 5.81 | 0 | 0.71 | 5.61 | 100 |
|   | Mass % | 18.74 | 1.87 | 0 | 1.17 | 0 | 0 | 6.19 | 30.79 | 0 | 16.22 | 15.68 | 0 | 2.34 | 7.01 | 100 |
| 7 | Cation % | 20.18 | 4.69 | 0 | 6.82 | 0 | 0 | 14.62 | 12.5 | 0 | 17.7 | 17.28 | 0 | 1.25 | 4.96 | 100 |
|   | Mole % | 23.75 | 2.76 | 0 | 4.01 | 0 | 0 | 17.2 | 14.71 | 0 | 20.83 | 10.17 | 0 | 0.74 | 5.84 | 100 |
|   | Mass % | 13.87 | 1.87 | 0 | 1.17 | 0 | 0 | 9.38 | 21.93 | 0 | 16.18 | 26.28 | 0 | 2.33 | 6.99 | 100 |
| 8 | Cation % | 21.18 | 4.69 | 0 | 6.82 | 0 | 0 | 14.62 | 12.5 | 0 | 29.7 | 4.28 | 0 | 1.25 | 4.96 | 100 |
|   | Mole % | 23.15 | 2.56 | 0 | 3.73 | 0 | 0 | 15.98 | 13.66 | 0 | 32.47 | 2.34 | 0 | 0.68 | 5.42 | 100 |
|   | Mass % | 15.85 | 2.03 | 0 | 1.27 | 0 | 0 | 10.21 | 23.87 | 0 | 29.54 | 7.08 | 0 | 2.54 | 7.61 | 100 |
| 9 | Cation % | 21.18 | 4.69 | 0 | 6.82 | 0 | 0 | 14.62 | 12.5 | 0 | 17.7 | 16.28 | 0 | 1.25 | 4.96 | 100 |
|   | Mole % | 24.78 | 2.74 | 0 | 3.99 | 0 | 0 | 17.1 | 14.62 | 0 | 20.71 | 9.52 | 0 | 0.73 | 5.8 | 100 |
|   | Mass % | 14.68 | 1.88 | 0 | 1.18 | 0 | 0 | 9.46 | 22.11 | 0 | 16.31 | 24.97 | 0 | 2.35 | 7.05 | 100 |
| 10 | Cation % | 18.18 | 4.69 | 0 | 6.82 | 0 | 0 | 14.62 | 12.5 | 0 | 22.53 | 14.45 | 0 | 1.25 | 4.96 | 100 |
|   | Mole % | 21.04 | 2.71 | 0 | 3.95 | 0 | 0 | 16.92 | 14.47 | 0 | 26.08 | 8.36 | 0 | 0.72 | 5.74 | 100 |
|   | Mass % | 12.66 | 1.89 | 0 | 1.18 | 0 | 0 | 9.5 | 22.21 | 0 | 20.86 | 22.26 | 0 | 2.36 | 7.08 | 100 |
| 11 | Cation % | 16.43 | 4.69 | 0 | 9.82 | 0 | 0 | 14.62 | 12.5 | 0 | 22.53 | 14.45 | 0 | 0 | 4.96 | 100 |
|   | Mole % | 19.21 | 2.74 | 0 | 5.74 | 0 | 0 | 17.1 | 14.62 | 0 | 26.34 | 8.45 | 0 | 0 | 5.8 | 100 |
|   | Mass % | 11.8 | 1.95 | 0 | 1.75 | 0 | 0 | 9.8 | 22.91 | 0 | 21.52 | 22.96 | 0 | 0 | 7.31 | 100 |
| 12 | Cation % | 20.93 | 4.69 | 0 | 5.32 | 0 | 0 | 14.62 | 12.5 | 0 | 22.53 | 14.45 | 0 | 0 | 4.96 | 100 |
|   | Mole % | 23.85 | 2.67 | 0 | 3.03 | 0 | 0 | 16.66 | 14.24 | 0 | 25.67 | 8.23 | 0 | 0 | 5.65 | 100 |
|   | Mass % | 14.68 | 1.91 | 0 | 0.93 | 0 | 0 | 9.57 | 22.37 | 0 | 21 | 22.41 | 0 | 0 | 7.13 | 100 |
| 13 | Cation % | 23.93 | 4.69 | 0 | 5.32 | 0 | 0 | 14.62 | 12.5 | 0 | 20.7 | 13.28 | 0 | 0 | 4.96 | 100 |
|   | Mole % | 27.08 | 2.65 | 0 | 3.01 | 0 | 0 | 16.55 | 14.15 | 0 | 23.43 | 7.52 | 0 | 0 | 5.61 | 100 |
|   | Mass % | 17.02 | 1.93 | 0 | 0.94 | 0 | 0 | 9.71 | 22.69 | 0 | 19.58 | 20.9 | 0 | 0 | 7.24 | 100 |
| 14 | Cation % | 25.93 | 4.69 | 0 | 5.32 | 0 | 0 | 13.54 | 11.58 | 0 | 20.7 | 13.28 | 0 | 0 | 4.96 | 100 |
|   | Mole % | 29.35 | 2.65 | 0 | 3.01 | 0 | 0 | 15.32 | 13.11 | 0 | 23.43 | 7.52 | 0 | 0 | 5.61 | 100 |
|   | Mass % | 18.62 | 1.95 | 0 | 0.95 | 0 | 0 | 9.08 | 21.22 | 0 | 19.77 | 21.1 | 0 | 0 | 7.31 | 100 |
| 15 | Cation % | 30.62 | 0 | 0 | 5.32 | 0 | 0 | 13.54 | 11.58 | 0 | 20.7 | 13.28 | 0 | 0 | 4.96 | 100 |
|   | Mole % | 33.76 | 0 | 0 | 2.93 | 0 | 0 | 14.93 | 12.77 | 0 | 22.82 | 7.32 | 0 | 0 | 5.47 | 100 |
|   | Mass % | 21.69 | 0 | 0 | 0.94 | 0 | 0 | 8.95 | 20.93 | 0 | 19.49 | 20.8 | 0 | 0 | 7.2 | 100 |
| 16 | Cation % | 11.93 | 18.69 | 0 | 5.32 | 0 | 0 | 13.54 | 11.58 | 0 | 20.7 | 13.28 | 0 | 0 | 4.96 | 100 |
|   | Mole % | 14.66 | 11.49 | 0 | 3.27 | 0 | 0 | 16.64 | 14.23 | 0 | 25.45 | 8.16 | 0 | 0 | 6.1 | 100 |
|   | Mass % | 8.95 | 8.12 | 0 | 0.99 | 0 | 0 | 9.48 | 22.16 | 0 | 20.64 | 22.03 | 0 | 0 | 7.63 | 100 |

TABLE 1-continued

| No. | | | | | | | | | | | | | | | | | |
|---|---|---|---|---|---|---|---|---|---|---|---|---|---|---|---|---|---|
| 17 | Cation % | 21.18 | 4.69 | 0 | 9.82 | 0 | 0 | 13 | 11.12 | 0 | 20.7 | 13.28 | 1 | 1.25 | 4.96 | 100 |
|    | Mole %   | 24.49 | 2.71 | 0 | 5.68 | 0 | 0 | 15.03 | 12.86 | 0 | 23.94 | 7.68 | 1.16 | 0.72 | 5.74 | 100 |
|    | Mass %   | 15    | 1.92 | 0 | 1.73 | 0 | 0 | 8.6 | 20.1 | 0 | 19.5 | 20.81 | 2.73 | 2.4 | 7.21 | 100 |
| 18 | Cation % | 21.18 | 4.69 | 0 | 9.82 | 0 | 0 | 13 | 11.12 | 0 | 20.7 | 13.28 | 0 | 1.25 | 3.46 | 100 |
|    | Mole %   | 25.22 | 2.79 | 0 | 5.85 | 0 | 0 | 15.48 | 13.24 | 0 | 24.65 | 7.91 | 0 | 0.74 | 4.12 | 100 |
|    | Mass %   | 15.78 | 2.02 | 0 | 1.82 | 0 | 0 | 9.04 | 21.14 | 0 | 20.5 | 21.88 | 0 | 2.52 | 5.29 | 100 |
| 19 | Cation % | 21.18 | 4.69 | 0 | 9.82 | 0 | 0 | 13 | 11.12 | 0 | 20.7 | 13.28 | 0 | 1.25 | 0.96 | 100 |
|    | Mole %   | 25.99 | 2.88 | 0 | 6.03 | 0 | 0 | 15.95 | 13.65 | 0 | 25.41 | 8.15 | 0 | 0.77 | 1.18 | 100 |
|    | Mass %   | 16.41 | 2.1  | 0 | 1.89 | 0 | 0 | 9.4 | 21.98 | 0 | 21.32 | 22.75 | 0 | 2.63 | 1.52 | 100 |
| 20 | Cation % | 21.18 | 4.69 | 0 | 9.82 | 0 | 0 | 13 | 11.12 | 0 | 20.7 | 13.28 | 0 | 1.25 | 0 | 100 |
|    | Mole %   | 26.3  | 2.91 | 0 | 6.1  | 0 | 0 | 16.15 | 13.81 | 0 | 25.71 | 8.25 | 0 | 0.78 | 0 | 100 |
|    | Mass %   | 16.66 | 2.14 | 0 | 1.92 | 0 | 0 | 9.54 | 22.32 | 0 | 21.65 | 23.11 | 0 | 2.67 | 0 | 100 |
| 21 | Cation % | 21.51 | 4.75 | 0 | 9.98 | 0 | 0 | 14.2 | 10.29 | 0 | 22 | 12.48 | 0 | 1.27 | 3.52 | 100 |
|    | Mole %   | 25.08 | 2.77 | 0 | 5.82 | 0 | 0 | 16.56 | 12 | 0 | 25.65 | 7.28 | 0 | 0.74 | 4.1 | 100 |
|    | Mass %   | 16.08 | 2.06 | 0 | 1.86 | 0 | 0 | 9.91 | 19.63 | 0 | 21.86 | 20.64 | 0 | 2.57 | 5.4 | 100 |
| 22 | Cation % | 23.13 | 3.8  | 0 | 7.98 | 5.52 | 0 | 11.56 | 9.72 | 0 | 22.71 | 11.52 | 0 | 1.02 | 3.04 | 100 |
|    | Mole %   | 27.19 | 2.23 | 0 | 4.69 | 3.24 | 0 | 13.59 | 11.42 | 0 | 26.69 | 6.77 | 0 | 0.6 | 3.57 | 100 |
|    | Mass %   | 17.73 | 1.69 | 0 | 1.52 | 2.18 | 0 | 8.27 | 19.02 | 0 | 23.15 | 19.54 | 0 | 2.12 | 4.78 | 100 |
| 23 | Cation % | 23.13 | 3.8  | 0 | 6.98 | 5.52 | 1 | 11.56 | 9.72 | 0 | 22.71 | 11.52 | 0 | 1.02 | 3.04 | 100 |
|    | Mole %   | 27.19 | 2.23 | 0 | 4.1  | 3.24 | 0.59 | 13.59 | 11.42 | 0 | 26.69 | 6.77 | 0 | 0.6 | 3.57 | 100 |
|    | Mass %   | 17.66 | 1.68 | 0 | 1.33 | 2.17 | 0.6 | 8.24 | 18.94 | 0 | 23.05 | 19.46 | 0 | 2.11 | 4.76 | 100 |
| 24 | Cation % | 23.13 | 3.8  | 0 | 6.98 | 6.52 | 0 | 11.56 | 9.72 | 0 | 22.71 | 11.52 | 0 | 1.02 | 3.04 | 100 |
|    | Mole %   | 27.19 | 2.23 | 0 | 4.1  | 3.83 | 0 | 13.59 | 11.42 | 0 | 26.69 | 6.77 | 0 | 0.6 | 3.57 | 100 |
|    | Mass %   | 17.7  | 1.68 | 0 | 1.33 | 2.57 | 0 | 8.26 | 18.98 | 0 | 23.1 | 19.5 | 0 | 2.12 | 4.77 | 100 |
| 25 | Cation % | 23.13 | 3.8  | 0 | 6.98 | 5.52 | 0 | 11.56 | 10.72 | 0 | 22.71 | 11.52 | 0 | 1.02 | 3.04 | 100 |
|    | Mole %   | 27.03 | 2.22 | 0 | 4.08 | 3.23 | 0 | 13.51 | 12.53 | 0 | 26.54 | 6.73 | 0 | 0.6 | 3.55 | 100 |
|    | Mass %   | 17.43 | 1.66 | 0 | 1.31 | 2.14 | 0 | 8.13 | 20.61 | 0 | 22.75 | 19.2 | 0 | 2.08 | 4.7 | 100 |
| 26 | Cation % | 23.13 | 3.8  | 0 | 6.98 | 5.52 | 0 | 12.56 | 9.72 | 0 | 22.71 | 11.52 | 0 | 1.02 | 3.04 | 100 |
|    | Mole %   | 27.03 | 2.22 | 0 | 4.08 | 3.23 | 0 | 14.68 | 11.36 | 0 | 26.54 | 6.73 | 0 | 0.6 | 3.55 | 100 |
|    | Mass %   | 17.64 | 1.68 | 0 | 1.32 | 2.17 | 0 | 8.94 | 18.92 | 0 | 23.03 | 19.43 | 0 | 2.11 | 4.75 | 100 |
| 27 | Cation % | 21.64 | 5.17 | 0 | 11.21 | 2.31 | 1.97 | 11.36 | 8.4 | 0 | 19.79 | 13.85 | 0.27 | 1.02 | 3.01 | 100 |
|    | Mole %   | 26.31 | 3.14 | 0 | 6.82 | 1.4 | 1.2 | 13.81 | 10.21 | 0 | 24.07 | 8.42 | 0.33 | 0.62 | 3.66 | 100 |
|    | Mass %   | 16.76 | 2.32 | 0 | 2.16 | 0.92 | 1.2 | 8.21 | 16.6 | 0 | 20.38 | 23.73 | 0.81 | 2.14 | 4.78 | 100 |
| 28 | Cation % | 21.64 | 5.17 | 0 | 11.21 | 2.31 | 1.97 | 11.36 | 8.4 | 0 | 17.79 | 15.85 | 0.27 | 1.02 | 3.01 | 100 |
|    | Mole %   | 26.64 | 3.18 | 0 | 6.9 | 1.42 | 1.21 | 13.98 | 10.34 | 0 | 21.9 | 9.76 | 0.33 | 0.63 | 3.71 | 100 |
|    | Mass %   | 16.53 | 2.29 | 0 | 2.13 | 0.91 | 1.18 | 8.1 | 16.38 | 0 | 18.07 | 26.79 | 0.8 | 2.11 | 4.72 | 100 |
| 29 | Cation % | 21.64 | 5.17 | 0 | 11.21 | 2.31 | 1.97 | 11.36 | 8.4 | 0 | 21.79 | 11.85 | 0.27 | 1.02 | 3.01 | 100 |
|    | Mole %   | 26    | 3.11 | 0 | 6.73 | 1.39 | 1.18 | 13.65 | 10.09 | 0 | 26.18 | 7.12 | 0.32 | 0.61 | 3.62 | 100 |
|    | Mass %   | 16.99 | 2.35 | 0 | 2.19 | 0.94 | 1.21 | 8.32 | 16.83 | 0 | 22.75 | 20.58 | 0.82 | 2.17 | 4.85 | 100 |
| 30 | Cation % | 21.64 | 5.17 | 0 | 11.21 | 2.31 | 1.97 | 11.36 | 8.4 | 0 | 23.79 | 9.85 | 0.27 | 1.02 | 3.01 | 100 |
|    | Mole %   | 25.69 | 3.07 | 0 | 6.65 | 1.37 | 1.17 | 13.49 | 9.97 | 0 | 28.24 | 5.85 | 0.32 | 0.61 | 3.57 | 100 |
|    | Mass %   | 17.23 | 2.38 | 0 | 2.22 | 0.95 | 1.23 | 8.44 | 17.07 | 0 | 25.18 | 17.35 | 0.83 | 2.2 | 4.92 | 100 |

| No. | | $Sb_2O_3$ (quantity added relative to the combined total) | $SiO_2/(SiO_2 + B_2O_3)$ | $Li_2O + Na_2O + K_2O + CaO + SrO + BaO$ | $Li_2O/(Li_2O + Na_2O + K_2O + CaO + SrO + BaO)$ | $TiO_2 + Nb_2O_5 + WO_3$ |
|---|---|---|---|---|---|---|
| 1 | Cation % | | — | — | — | — |
|   | Mole %   | | — | — | — | — |
|   | Mass %   | 0.02 | 0.901 | 27.420 | 0.054 | 37.150 |
| 2 | Cation % | | — | — | — | — |
|   | Mole %   | | — | — | — | — |
|   | Mass %   | 0.02 | 0.909 | 28.120 | 0.048 | 37.070 |
| 3 | Cation % | | — | — | — | — |
|   | Mole %   | | — | — | — | — |
|   | Mass %   | 0.02 | 0.909 | 39.830 | 0.029 | 31.030 |
| 4 | Cation % | | — | — | — | — |
|   | Mole %   | | — | — | — | — |
|   | Mass %   | 0.02 | 0.909 | 44.140 | 0.024 | 28.810 |
| 5 | Cation % | | — | — | — | — |
|   | Mole %   | | — | — | — | — |
|   | Mass %   | 0.02 | 0.909 | 34.490 | 0.036 | 33.780 |
| 6 | Cation % | | — | — | — | — |
|   | Mole %   | | — | — | — | — |
|   | Mass %   | 0.02 | 0.909 | 38.150 | 0.031 | 31.900 |
| 7 | Cation % | | — | — | — | — |
|   | Mole %   | | — | — | — | — |
|   | Mass %   | 0.02 | 0.881 | 32.480 | 0.036 | 42.460 |
| 8 | Cation % | | — | — | — | — |
|   | Mole %   | | — | — | — | — |
|   | Mass %   | 0.02 | 0.886 | 35.350 | 0.036 | 36.620 |
| 9 | Cation % | | — | — | — | — |
|   | Mole %   | | — | — | — | — |
|   | Mass %   | 0.02 | 0.886 | 32.750 | 0.036 | 41.280 |
| 10 | Cation % | | — | — | — | — |
|    | Mole %   | | — | — | — | — |
|    | Mass %   | 0.02 | 0.870 | 32.890 | 0.036 | 43.120 |
| 11 | Cation % | | — | — | — | — |
|    | Mole %   | | — | — | — | — |
|    | Mass %   | 0.02 | 0.858 | 34.460 | 0.051 | 44.480 |

TABLE 1-continued

| | | | | | | |
|---|---|---|---|---|---|---|
| 12 | Cation % | — | — | — | — | — |
| | Mole % | — | — | — | — | — |
| | Mass % | 0.02 | 0.885 | 32.870 | 0.028 | 43.410 |
| 13 | Cation % | — | — | — | — | — |
| | Mole % | — | — | — | — | — |
| | Mass % | 0.02 | 0.898 | 33.340 | 0.028 | 40.480 |
| 14 | Cation % | — | — | — | — | — |
| | Mole % | — | — | — | — | — |
| | Mass % | 0.02 | 0.905 | 31.250 | 0.030 | 40.870 |
| 15 | Cation % | — | — | — | — | — |
| | Mole % | — | — | — | — | — |
| | Mass % | 0.02 | 1.000 | 30.820 | 0.030 | 40.290 |
| 16 | Cation % | — | — | — | — | — |
| | Mole % | — | — | — | — | — |
| | Mass % | 0.02 | 0.524 | 32.630 | 0.030 | 42.670 |
| 17 | Cation % | — | — | — | — | — |
| | Mole % | — | — | — | — | — |
| | Mass % | 0.02 | 0.887 | 30.430 | 0.057 | 43.040 |
| 18 | Cation % | — | — | — | — | — |
| | Mole % | — | — | — | — | — |
| | Mass % | 0.02 | 0.887 | 32.000 | 0.057 | 42.380 |
| 19 | Cation % | — | — | — | — | — |
| | Mole % | — | — | — | — | — |
| | Mass % | 0.02 | 0.887 | 33.270 | 0.057 | 44.070 |
| 20 | Cation % | — | — | — | — | — |
| | Mole % | — | — | — | — | — |
| | Mass % | 0.02 | 0.886 | 33.780 | 0.057 | 44.760 |
| 21 | Cation % | — | — | — | — | — |
| | Mole % | — | — | — | — | — |
| | Mass % | 0.02 | 0.886 | 31.400 | 0.059 | 42.500 |
| 22 | Cation % | — | — | — | — | — |
| | Mole % | — | — | — | — | — |
| | Mass % | 0.02 | 0.913 | 30.990 | 0.049 | 42.690 |
| 23 | Cation % | — | — | — | — | — |
| | Mole % | — | — | — | — | — |
| | Mass % | 0.02 | 0.913 | 31.280 | 0.043 | 42.510 |
| 24 | Cation % | — | — | — | — | — |
| | Mole % | — | — | — | — | — |
| | Mass % | 0.02 | 0.913 | 31.140 | 0.043 | 42.600 |
| 25 | Cation % | — | — | — | — | — |
| | Mole % | — | — | — | — | — |
| | Mass % | 0.02 | 0.913 | 32.190 | 0.041 | 41.950 |
| 26 | Cation % | — | — | — | — | — |
| | Mole % | — | — | — | — | — |
| | Mass % | 0.02 | 0.913 | 31.350 | 0.042 | 42.460 |
| 27 | Cation % | — | — | — | — | — |
| | Mole % | — | — | — | — | — |
| | Mass % | 0.02 | 0.878 | 29.090 | 0.074 | 44.920 |
| 28 | Cation % | — | — | — | — | — |
| | Mole % | — | — | — | — | — |
| | Mass % | 0.02 | 0.878 | 28.700 | 0.074 | 45.660 |
| 29 | Cation % | — | — | — | — | — |
| | Mole % | — | — | — | — | — |
| | Mass % | 0.02 | 0.878 | 29.490 | 0.074 | 44.150 |
| 30 | Cation % | — | — | — | — | — |
| | Mole % | — | — | — | — | — |
| | Mass % | 0.02 | 0.879 | 29.910 | 0.074 | 43.360 |

| No. | | $TiO_2/(TiO_2 + Nb_2O_5 + WO_3)$ | $CaO + BaO$ | $(Na_2O + K_2O)/Li_2O + Na_2O + K_2O + CaO + SrO + BaO$ | $(CaO + BaO)/Li_2O + Na_2O + K_2O + CaO + SrO + BaO$ |
|---|---|---|---|---|---|
| 1 | Cation % | — | — | — | — |
| | Mole % | — | — | — | — |
| | Mass % | 0.471 | 25.950 | 0.000 | 0.946 |
| 2 | Cation % | — | — | — | — |
| | Mole % | — | — | — | — |
| | Mass % | 0.508 | 26.760 | 0.000 | 0.952 |
| 3 | Cation % | — | — | — | — |
| | Mole % | — | — | — | — |
| | Mass % | 0.509 | 38.690 | 0.000 | 0.971 |
| 4 | Cation % | — | — | — | — |
| | Mole % | — | — | — | — |
| | Mass % | 0.509 | 43.080 | 0.000 | 0.976 |
| 5 | Cation % | — | — | — | — |
| | Mole % | — | — | — | — |
| | Mass % | 0.509 | 33.250 | 0.000 | 0.964 |
| 6 | Cation % | — | — | — | — |
| | Mole % | — | — | — | — |
| | Mass % | 0.508 | 36.980 | 0.000 | 0.969 |

TABLE 1-continued

| | | | | | |
|---|---|---|---|---|---|
| 7 | Cation % | — | — | — | — |
| | Mole % | — | — | — | — |
| | Mass % | 0.381 | 31.310 | 0.000 | 0.964 |
| 8 | Cation % | — | — | — | — |
| | Mole % | — | — | — | — |
| | Mass % | 0.807 | 34.080 | 0.000 | 0.964 |
| 9 | Cation % | — | — | — | — |
| | Mole % | — | — | — | — |
| | Mass % | 0.395 | 31.570 | 0.000 | 0.964 |
| 10 | Cation % | — | — | — | — |
| | Mole % | — | — | — | — |
| | Mass % | 0.484 | 31.710 | 0.000 | 0.964 |
| 11 | Cation % | — | — | — | — |
| | Mole % | — | — | — | — |
| | Mass % | 0.484 | 32.710 | 0.000 | 0.949 |
| 12 | Cation % | — | — | — | — |
| | Mole % | — | — | — | — |
| | Mass % | 0.484 | 31.940 | 0.000 | 0.972 |
| 13 | Cation % | — | — | — | — |
| | Mole % | — | — | — | — |
| | Mass % | 0.484 | 32.400 | 0.000 | 0.972 |
| 14 | Cation % | — | — | — | — |
| | Mole % | — | — | — | — |
| | Mass % | 0.484 | 30.300 | 0.000 | 0.970 |
| 15 | Cation % | — | — | — | — |
| | Mole % | — | — | — | — |
| | Mass % | 0.484 | 29.880 | 0.000 | 0.970 |
| 16 | Cation % | — | — | — | — |
| | Mole % | — | — | — | — |
| | Mass % | 0.484 | 31.640 | 0.000 | 0.970 |
| 17 | Cation % | — | — | — | — |
| | Mole % | — | — | — | — |
| | Mass % | 0.453 | 28.700 | 0.000 | 0.943 |
| 18 | Cation % | — | — | — | — |
| | Mole % | — | — | — | — |
| | Mass % | 0.484 | 30.180 | 0.000 | 0.943 |
| 19 | Cation % | — | — | — | — |
| | Mole % | — | — | — | — |
| | Mass % | 0.484 | 31.380 | 0.000 | 0.943 |
| 20 | Cation % | — | — | — | — |
| | Mole % | — | — | — | — |
| | Mass % | 0.484 | 31.860 | 0.000 | 0.943 |
| 21 | Cation % | — | — | — | — |
| | Mole % | — | — | — | — |
| | Mass % | 0.514 | 29.540 | 0.000 | 0.941 |
| 22 | Cation % | — | — | — | — |
| | Mole % | — | — | — | — |
| | Mass % | 0.542 | 27.290 | 0.070 | 0.881 |
| 23 | Cation % | — | — | — | — |
| | Mole % | — | — | — | — |
| | Mass % | 0.542 | 27.180 | 0.089 | 0.869 |
| 24 | Cation % | — | — | — | — |
| | Mole % | — | — | — | — |
| | Mass % | 0.542 | 27.240 | 0.083 | 0.875 |
| 25 | Cation % | — | — | — | — |
| | Mole % | — | — | — | — |
| | Mass % | 0.542 | 28.740 | 0.066 | 0.893 |
| 26 | Cation % | — | — | — | — |
| | Mole % | — | — | — | — |
| | Mass % | 0.542 | 27.860 | 0.069 | 0.889 |
| 27 | Cation % | — | — | — | — |
| | Mole % | — | — | — | — |
| | Mass % | 0.454 | 24.810 | 0.073 | 0.853 |
| 28 | Cation % | — | — | — | — |
| | Mole % | — | — | — | — |
| | Mass % | 0.396 | 24.480 | 0.073 | 0.853 |
| 29 | Cation % | — | — | — | — |
| | Mole % | — | — | — | — |
| | Mass % | 0.515 | 25.150 | 0.073 | 0.853 |
| 30 | Cation % | — | — | — | — |
| | Mole % | — | — | — | — |
| | Mass % | 0.581 | 25.510 | 0.073 | 0.853 |

| No. | nd | vd | Pg, F | nC | nF | ng | Tg (° C.) | Tx (° C.) | Tx − Tg (° C.) | Liquidus temp/ (° C.) | α (×10$^{-7}$/° C.) | Specific gravity | λ80 (nm) | λ70 (nm) | λ5 (nm) |
|---|---|---|---|---|---|---|---|---|---|---|---|---|---|---|---|
| 1 | 1.87939 | 28.31 | 0.6066 | 1.87041 | 1.90147 | 1.92031 | 672.2 | 835.2 | 163 | 1235 | — | 3.591 | 520 | 443 | 365 |
| 2 | 1.8894 | 27.02 | 0.60936 | 1.87993 | 1.91285 | 1.93291 | 668.4 | 856.2 | 187.8 | 1265 | — | 3.743 | 536 | 453 | 369 |
| 3 | 1.88781 | 27.62 | 0.60703 | 1.87856 | 1.9107 | 1.93021 | 675.3 | 833.8 | 158.5 | 1210 | — | 4.202 | 531 | 447 | 367 |

TABLE 1-continued

| | | | | | | | | | | | | | | |
|---|---|---|---|---|---|---|---|---|---|---|---|---|---|---|
| 4 | 1.88611 | 28.01 | 0.60639 | 1.87698 | 1.90861 | 1.92779 | 681.6 | 805.7 | 124.1 | 1210 | — | 4.395 | 523 | 443 | 367 |
| 5 | 1.88864 | 27.4 | 0.61178 | 1.87935 | 1.91178 | 1.93162 | 671.3 | 859.7 | 188.4 | 1160 | 91.9 | 3.977 | 523 | 436 | 367 |
| 6 | 1.88832 | 27.6 | 0.61094 | 1.87903 | 1.91121 | 1.93087 | 674.1 | 852.5 | 178.4 | 1190 | 93.7 | 4.129 | 521 | 434 | 365 |
| 7 | 1.95437 | 24.86 | 0.61448 | 1.94338 | 1.98177 | 2.00536 | 666.8 | 820.2 | 153.4 | 1260 | — | 4.173 | — | 490 | 372 |
| 8 | 1.94372 | 24.32 | 0.62097 | 1.9326 | 1.97141 | 1.99551 | 665.2 | 827 | 161.8 | 1270 | 96.6 | 3.977 | 581 | 474 | 378 |
| 9 | 1.94491 | 25.19 | 0.61557 | 1.93413 | 1.97164 | 1.99473 | 665.6 | 828.9 | 163.3 | 1250 | 92.7 | 4.145 | 569 | 459 | 372 |
| 10 | 1.97285 | 23.95 | 0.61965 | 1.96124 | 2.00186 | 2.02703 | 664.3 | 818.2 | 153.9 | 1230 | 96.4 | 4.167 | 654 | 476 | 376 |
| 11 | 1.97467 | 23.8 | 0.62198 | 1.96296 | 2.00391 | 2.02938 | 639.7 | 767.6 | 127.9 | 1235 | 98.4 | 4.127 | 600 | 472 | 375 |
| 12 | 1.96165 | 23.84 | 0.62063 | 1.95016 | 1.99049 | 2.01552 | 670 | 835.9 | 165.9 | 1220 | — | 4.087 | — | 479 | 377 |
| 13 | 1.93325 | 24.89 | 0.6199 | 1.92252 | 1.96001 | 1.98325 | 665.6 | 838.6 | 173 | 1200 | 92.3 | 4.02 | 551 | 451 | 373 |
| 14 | 1.92763 | 24.76 | 0.61863 | 1.91691 | 1.95438 | 1.97756 | 672.3 | 822 | 149.7 | 1190 | 88.5 | 3.972 | 556 | 455 | 375 |
| 15 | 1.91655 | 25.14 | 0.61903 | 1.90608 | 1.94254 | 1.96511 | 682.3 | 843.9 | 161.6 | 1195 | 86.1 | 3.935 | 539 | 447 | 374 |
| 16 | 1.95808 | 23.87 | 0.6215 | 1.94655 | 1.98668 | 2.01162 | 618.1 | 774.5 | 156.4 | 1185 | — | 4.043 | 600 | 477 | 378 |
| 17 | 1.95063 | 24.43 | 0.61639 | 1.9395 | 1.97842 | 2.00241 | 643.3 | 805.3 | 162 | 1200 | 92.4 | 4.11 | 578 | 458 | 373 |
| 18 | 1.94455 | 24.51 | 0.619 | 1.93354 | 1.97207 | 1.99592 | 641.6 | 807.7 | 166.1 | 1185 | 93.7 | 4.038 | 563 | 458 | 373 |
| 19 | 1.93849 | 24.47 | 0.62581 | 1.92752 | 1.96587 | 1.98987 | 633.6 | 780.2 | 146.6 | 1185 | 94.9 | 4.001 | 566 | 460 | 373 |
| 20 | 1.93611 | 24.31 | 0.6201 | 1.92513 | 1.96364 | 1.98752 | 629.9 | 791.9 | 162 | 1185 | 95.4 | 3.987 | 564 | 461 | 374 |
| 21 | 1.94468 | 24.39 | 0.61771 | 1.93364 | 1.97238 | 1.99631 | 641.1 | 805.3 | 164.2 | 1175 | 94.3 | 3.99 | 559 | 456 | 373 |
| 22 | 1.92964 | 24.1 | 0.61706 | 1.91865 | 1.95722 | 1.98102 | 629.4 | 799.2 | 169.8 | 1160 | 96.7 | 3.903 | — | 516 | 416 |
| 23 | 1.92516 | 24.19 | 0.61925 | 1.91424 | 1.95248 | 1.97616 | 630.3 | 789.7 | 159.4 | 1175 | — | 3.89 | — | — | 374 |
| 24 | 1.92725 | 24.07 | 0.61277 | 1.9163 | 1.95483 | 1.97844 | 630.4 | 797 | 166.6 | 1175 | — | 3.898 | 537 | 448 | 372 |
| 25 | 1.92863 | 24.27 | 0.61918 | 1.91773 | 1.95599 | 1.97968 | 633.8 | 800.8 | 167 | 1170 | 96.7 | 3.936 | 537 | 446 | 372 |
| 26 | 1.92879 | 24.29 | 0.62333 | 1.9178 | 1.95603 | 1.97986 | — | — | — | 1175 | — | 3.905 | 534 | 444 | 372 |
| 27 | 1.92971 | 24.24 | 0.62008 | 1.91874 | 1.95709 | 1.98087 | 610.6 | 771.3 | 160.7 | 1160 | 96.6 | 3.892 | 537 | 449 | 371 |
| 28 | 1.92955 | 24.38 | 0.61805 | 1.91866 | 1.95678 | 1.98034 | 608.4 | 775.7 | 167.3 | 1180 | — | 3.921 | 539 | 448 | 370 |
| 29 | 1.92976 | 24.05 | 0.62002 | 1.9187 | 1.95736 | 1.98133 | — | — | — | 1200 | — | 3.866 | — | 463 | 372 |
| 30 | 1.92978 | 23.91 | 0.62166 | 1.91871 | 1.95759 | 1.98176 | — | — | — | 1200 | — | 3.839 | 540 | 451 | 372 |

Each of the above optical glasses was prepared by heating and melting a starting material powder (powder starting material). It is also possible to fabricate them by coarsely melting the powder starting material to form cullets, blending the cullets thus obtained to obtain a starting material, and heating and melting the starting material.

In this manner, high refractive index, high dispersion optical glasses that had good thermal stability, were suited to the reheat pressing method, with decreased coloration, and had the high expansion characteristic that is desirable in materials for optical elements suited to bonding to optical elements made of fluorophosphate glass were obtained.

Example 2

Each of the optical gasses of glass Nos. 1 to 30 that was prepared in Example 1 was ground and polished to prepare a press-molding glass material. A boron nitride powder was then uniformly applied to the surface of the press-molding glass material, the glass material was placed on a heat-resistant softening dish, and the dish was placed in a heat softening furnace and heated.

Heating was then conducted to a temperature at which the viscosity reached $10^{3.5}$ to $10^{4.5}$. The softened glass material was introduced into a pressing mold from the heat-softening dish and pressed to mold it into the shape of a concave meniscus lens. The molded lens blank was removed from the pressing mold and annealed.

The lens blank thus obtained was ground and polished to fabricate a concave meniscus lens.

Similarly, various spherical lenses such as biconcave lenses were fabricated.

Observation of the interior of each of the lenses thus obtained revealed no precipitation of crystals, confirming that a lens of high homogeneity had been obtained.

It is possible to coat an antireflective film as needed on the optically functional surface of a lens that is obtained.

Example 3

Three optical glasses in the form of a fluorophosphate glass with a refractive index nd of 1.49700, an Abbé number vd of 81.61, a partial dispersion ratio Pg, F of 0.5388, and an average coefficient of linear expansion at 100 to 300° C. of $155 \times 10^{-7}/°$ C.; a fluorophosphate glass with a refractive index nd of 1.45860, an Abbé number vd of 90.20, a partial dispersion ratio Pg, F of 0.5352, and an average coefficient of linear expansion at 100 to 300° C. of $165 \times 10^{-7}/°$ C.; and a fluorophosphate glass with a refractive index nd of 1.59282, an Abbé number vd of 68.63, a partial dispersion ratio Pg, F of 0.5441, and an average coefficient of linear expansion at 100 to 300° C. of $140 \times 10^{-7}/°$ C. were ground and polished to fabricate spherical lenses with biconvex shapes. Lens surface processing was conducted so that the shapes of the concave surfaces of the concave meniscus lenses fabricated in Example 2 were the inverse shapes of these convex surfaces.

Next, the concave surface of each of the concave meniscus lenses fabricated in Example 2 and one of the convex surfaces of each of the biconvex lenses made of the various fluorophosphate glasses were coated with an ultraviolet radiation-curable adhesive, the two surfaces were precisely adhered so that no air bubbles were contained, and irradiation with ultraviolet radiation was conducted to bond the lenses.

Similarly, spherical lenses that were biconvex in shape were fabricated by grinding and polishing each of the three fluorophosphate glasses set forth above to a convex lens shape that was inverse in shape to one of the concave surfaces of the biconcave lenses fabricated in Example 2. An ultraviolet radiation-curable adhesive was then coated on one of the concave surfaces of each of the biconcave lenses fabricated in Example 2 and on one of the convex surfaces of the biconvex lenses made of the various fluorophosphate glasses, the two were precisely adhered so that no air bubbles were contained, and irradiation with ultraviolet radiation was conducted to bond the lenses.

Bonded lenses for chromatic aberration correction were thus fabricated. No defect due to UV irradiation was observed on any of the bonded surfaces of the various bonded lenses obtained. Nor was any defect observed on the bonded surfaces following temperature cycle testing.

The optical glass of the present invention, a high refractive index, high dispersion glass, can be suitably employed to fabricate bonded lenses for chromatic aberration correction by combining it with a lens made of fluorophosphate glass having both low dispersion and abnormal partial dispersion.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. An optical glass, which comprises, denoted as weight percent,
    2 to 37 percent of $SiO_2$,
    0 to 25 percent of $B_2O_3$,
    0 to 10 percent of $GeO_2$,
    18 to 55 percent of a combined content of $Li_2O$, $Na_2O$, $K_2O$, CaO, SrO, and BaO, 33.78 to 55 percent of a combined content of $TiO_2$, $Nb_2O_5$, and $WO_3$, and
    0 to 15 percent of $La_2O_3$;
    wherein the weight ratio of $SiO_2$ content relative to a combined content of $SiO_2$ and $B_2O_3$ ($SiO_2/(SiO_2+B_2O_3)$) ranges from 0.1 to 1;
    a weight ratio of the $Li_2O$ content to a combined content of $Li_2O$, $Na_2O$, $K_2O$, CaO, SrO, and BaO ($Li_2O/(Li_2O+Na_2O+K_2O+CaO+SrO+BaO)$) ranges from 0 to 0.4; and
    a weight ratio of $TiO_2$ content relative to a combined content of $TiO_2$, $Nb_2O_5$, and $WO_3$ ($TiO_2/(TiO_2+Nb_2O_5+WO_3)$) ranges from 0.35 to 1;
    a specific gravity being equal to or less than 4.3; and
    which has a refractive index nd ranging from 1.87939 to 1.990 and an Abbé number vd ranging from 21 to 29.

2. The optical glass according to claim 1, wherein a difference (Tx−Tg) between a peak crystallization temperature Tx and a glass transition temperature Tg is equal to or greater than 120° C.

3. The optical glass according to claim 1, which has a liquidus temperature LT of equal to or lower than 1,300° C.

4. The optical glass according to claim 1, which has an average coefficient of linear expansion α at 100 to 300° C. of equal to or greater than $85 \times 10^{-7}/°$ C.

5. The optical glass according to claim 1, wherein the content of $La_2O_3$ ranges from 0 to 11 weight percent.

6. An optical element, which is comprised of the optical glass according to claim 1.

7. A bonded optical element, wherein an optical element comprised of the optical glass according to claim 1 is bonded to an optical element comprised of fluorophosphate glass.

8. A press-molding glass material, which is comprised of the optical glass according to claim 1.

9. A method of manufacturing an optical element, which comprises:
    preparing an optical element blank by press molding the press-molding glass material according to claim 8 in a heat-softened state; and
    grinding and polishing the optical element blank that has been prepared to provide an optical element.

10. An optical glass, which comprises, denoted as weight percent,
    2 to 37 percent of $SiO_2$,
    0 to 25 percent of $B_2O_3$,
    0 to 10 percent of $GeO_2$,
    18 to 55 percent of a combined content of $Li_2O$, $Na_2O$, $K_2O$, CaO, SrO, and BaO, and
    27 to 55 percent of a combined content of $TiO_2$, $Nb_2O_5$, and $WO_3$; as well as comprises no $La_2O_3$;
    wherein the weight ratio of $SiO_2$ content relative to a combined content of $SiO_2$ and $B_2O_3$ ($SiO_2/(SiO_2+B_2O_3)$) ranges from 0.1 to 1;
    a weight ratio of the $Li_2O$ content to a combined content of $Li_2O$, $Na_2O$, $K_2O$, CaO, SrO, and BaO ($Li_2O/(Li_2O+Na_2O+K_2O+CaO+SrO+BaO)$) ranges from 0 to 0.4; and
    a weight ratio of $TiO_2$ content relative to a combined content of $TiO_2$, $Nb_2O_5$, and $WO_3$ ($TiO_2/(TiO_2+Nb_2O_5+WO_3)$) ranges from 0.35 to 1; and
    which has a refractive index nd ranging from 1.860 to 1.990 and an Abbé number vd ranging from 21 to 29.

11. An optical element, which is comprised of the optical glass according to claim 10.

12. A bonded optical element, wherein an optical element comprised of the optical glass according to claim 10 is bonded to an optical element comprised of fluorophosphate glass.

13. A press-molding glass material, which is comprised of the optical glass according to claim 10.

14. A method of manufacturing an optical element, which comprises:
    preparing an optical element blank by press molding the press-molding glass material according to claim 13 in a heat-softened state; and
    grinding and polishing the optical element blank that has been prepared to provide an optical element.

* * * * *